United States Patent [19]

Megnint

[11] 4,120,602
[45] Oct. 17, 1978

[54] METHOD AND APPARATUS FOR CONTROLLING A WATER TURBINE

[75] Inventor: Lucien Megnint, Grenoble, France

[73] Assignees: Neyrpic - Creusot Loire, Grenoble; Compagnie Nationale du Rhone, Lyons, both of France

[21] Appl. No.: 757,796

[22] Filed: Jan. 3, 1977

[30] Foreign Application Priority Data
Jan. 6, 1976 [FR] France .................. 76 00154

[51] Int. Cl.² ......................................... F01D 17/00
[52] U.S. Cl. ............................. 415/1; 60/398; 290/52; 415/160
[58] Field of Search ............... 60/325, 398; 290/52; 415/1, 151, 209, 159, 160, 155, 500

[56] References Cited
U.S. PATENT DOCUMENTS

| 1,978,809 | 10/1934 | Moody | 415/500 |
|---|---|---|---|
| 2,366,732 | 1/1945 | Kalix | 290/52 |
| 2,897,375 | 7/1959 | Fevre | 290/52 |
| 3,279,174 | 10/1966 | Yokoi | 60/325 |
| 3,582,667 | 6/1971 | Mayo, Jr. | 415/1 |

FOREIGN PATENT DOCUMENTS

| 1,295,782 | 5/1962 | France | 290/52 |
|---|---|---|---|
| 329,154 | 4/1958 | Switzerland | 290/52 |
| 337,805 | 5/1959 | Switzerland | 290/52 |
| 1,016,203 | 1/1966 | United Kingdom | 290/52 |
| 1,054,962 | 1/1967 | United Kingdom | 60/398 |

Primary Examiner—C. J. Husar
Attorney, Agent, or Firm—Sughrue, Rothwell, Mion, Zinn and Macpeak

[57] ABSTRACT

A method of controlling the operation of a water turbine, in particular a bulb type turbine, wherein the mobile guide vane assembly serves only to reflect the water during operation, the starting and stopping of the turbine being controlled and water-tight sealing when the turbine is stopped being provided by a gate sluice.

2 Claims, 3 Drawing Figures

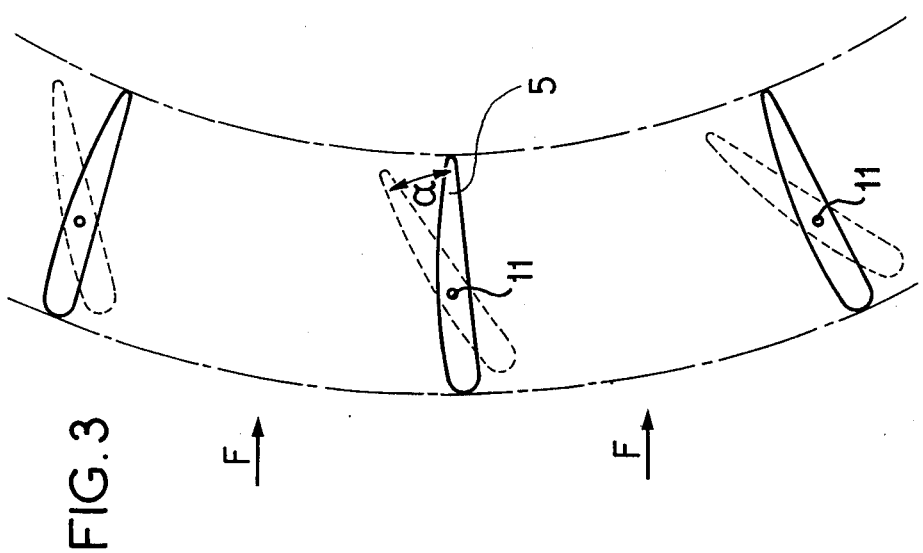
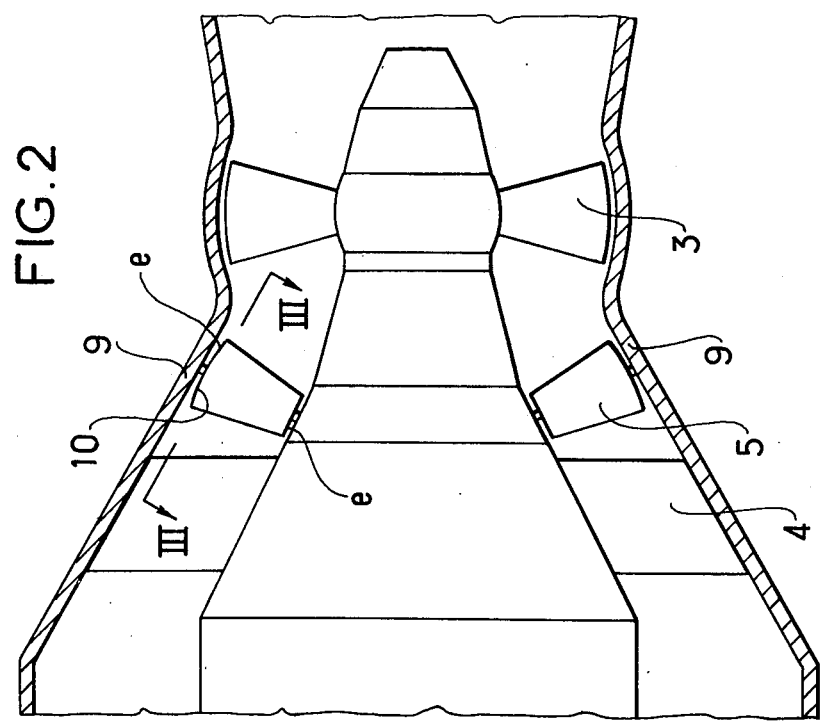

METHOD AND APPARATUS FOR CONTROLLING A WATER TURBINE

BACKGROUND OF THE INVENTION

The operation of water turbines is generally controlled by means of a mobile guide vane assembly which fulfills three functions:

The deflection of the water during normal operation;

The control of the flow variations during starting up and stopping;

The provision of water tight sealing in the completely closed position when the machine is stopped.

Such guide vane assemblies (and in particular the conical guide vane assemblies of bulb type turbines) are difficult to manufacture if they are to fulfill these three functions.

SUMMARY OF THE INVENTION

With a view to simplifying the structure of mobile guide vane assemblies and in particular those of bulb type turbines, the present invention provides a method of controlling the operation of a water turbine, in particular a bulb type turbine, wherein the mobile guide vane assembly serve only to deflect the water during operation, the starting and stopping of the turbine being controlled and water-tight sealing when the turbine is stopped being provided by a gate sluice.

Under these conditions, the guide vane assembly need not be water-tight and it comprises vanes having limited angular play which is merely sufficient to produce the required deflection of water during operation of the turbine. Hence there results a great simplification in the structure thereof.

The clearance between the guide vanes and the housing plates can be greater, hence allowing a more simplified shape of the parts and machining which is not so precise. It is also possible to impart a better hydraulic shape to the vanes. Lastly, the number and the length of the vanes can be reduced, for the guide vane assembly no longer has to close the duct completely.

A non-limiting embodiment will now be described by way of an example with reference to the accompanying drawings.

BRIEF DESCRIPTION OF THE DRAWINGS

FIG. 2 is a vertical axial cross-section of a guide vane assembly embodying the invention and, FIG. 3 is an enlarged view of the guide vane assembly along the plane III—III in FIG. 2.

DESCRIPTION OF THE PREFERRED EMBODIMENT

Figure 1:
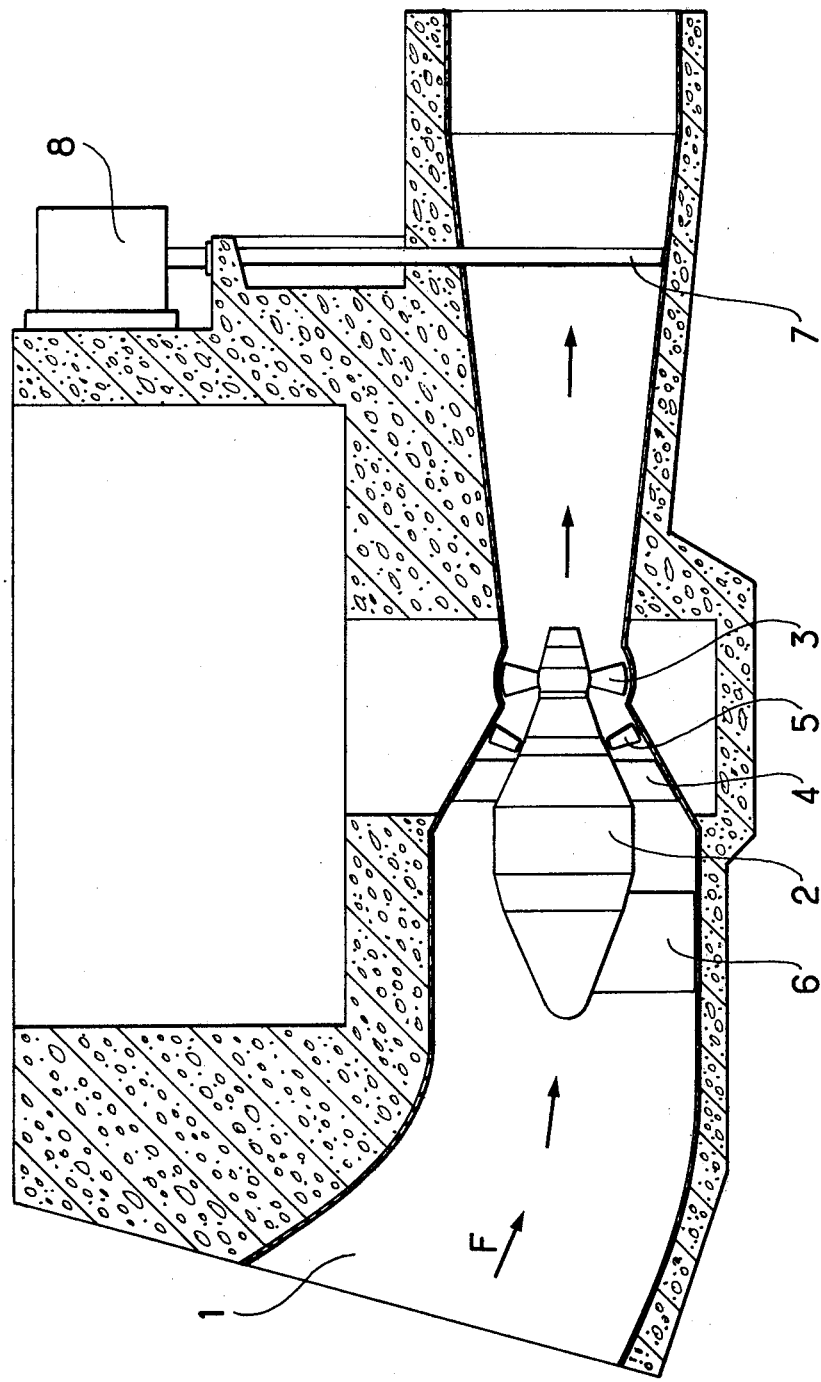
FIG. 1 is a vertical, axial cross-section of an installation embodying the invention.

FIG. 1 is a general view of an installation comprising a hydroelectric generating set of the bulb type with a water inlet duct 1 in which water flows in the direction of arrows F.

Inside the duct 1, there is a bulb 2 containing the alternator of a hydroelectric generating set. At the downstream end of the bulb there is disposed a water turbine 3.

This turbine is provided with a stationary conical front guide vane assembly 4 and a mobile conical guide vane assembly which comprises variable-pitch guide vanes 5 mounted for pivoting about axis 11, FIG. 3. The bulb 2 is held in the duct 1 by a support 6 and the front guide vane assembly 4.

The installation is completed by a gate sluice 7 for closing the duct and controlled by a servo-motor 8.

FIGS. 2 and 3 show the variable pitch guide vanes 5 on an enlarged scale.

These guide vanes are designed only to deflect the water during operation, the starting and stopping of the turbine being controlled, and water-tight sealing when the turbine is stopped, being provided by the gate sluice 7.

In these conditions, the pivotable guide vanes which comprise a circumferentially spaced array, are short and non-contiguous, as shown by the enlarged view in FIG. 3, with the turbine including means for limiting pivoting about axis 11 to an angular play "α" of about 30°.

As also shown by FIG. 2, there can be considerable clearance (e) between the guide vanes 5 and the housing plates 9 of the guide vane assembly.

These simplifications of structure are particularly advantageous in the case of a hydro-electric generating set of the bulb type.

Indeed, in such hydro-electric generating sets, where the guide vane assemblies are conical, it is normally necessary, in order to ensure fluid-tight sealing of these guide vane assemblies, to form spherical bosses on the conical housing plates on which the outer edges of the guide vanes bear; these bosses must include corresponding curved surfaces. This entails considerable difficulties when very small clearance is required between the edges of the guide vanes and the spherical surfaces of the housing plates in order to ensure water-tight sealing of the guide vane assembly.

As shown in FIG. 2, the structure of the guide vane assembly and of the guide vanes embodying the invention is simple, since the housing plates 9 of the guide vane assembly remain conical over their whole surface and include no surface modification adjacent the blades and since only the outer surfaces 10 of the guide vanes have inclined ends which are simple to manufacture in view of the considerable clearance in relation to the housing plates.

What is claimed is:

1. A method of controlling the operation of a bulb type water turbine having a mobile guide vane assembly comprising a plurality of pivotable guide vanes which are short and non-contiguous and constitute a circumferential array in juxtaposition to a stationary conical front guide vane assembly and downstream thereof, a water turbine disposed downstream of said bulb for receiving water flow discharging from said pivotable guide vanes and a gate sluice downstream of said turbine for closing off flow through an annular duct carrying said bulb, said mobile guide vane assembly and said stationary guide vane assembly, said method comprising the steps of:

limiting the angular play of the pivotable guide vanes during turbine operation to cause said mobile guide vane assembly to only, variably deflect the water during turbine operation and employing the gate sluice for controlling the starting and stopping of the turbine and water-tight sealing of the turbine when the turbine is stopped.

2. A bulb type water turbine comprising:

a tubular water inlet duct, a bulb coaxially mounted within said duct and defining an annular water flow path between said bulb and said inlet duct, a stationary conical front guide vane assembly interposed within said annular path and between said bulb and said duct, a mobile conical guide vane assembly in juxtaposition to said stationary conical front guide vane assembly and downstream thereof and comprising a circumferentially spaced array of short, non-contiguous variable pitch guide vanes and pivotably mounted for rotation about radial axes within said duct, means for limiting the angular play of said pivotable guide vanes such that said pivotable guide vanes serve only to deflect the water during turbine operation, a water turbine disposed on the downstream end of said bulb for receiving water flow discharging from said pivotable, variable pitch guide vanes, and a gate sluice downstream of said turbine within said annular duct for controlling the starting and stopping of the turbine and water-tight sealing of the turbine when said turbine is stopped.

* * * * *